(12) United States Patent
Nishimura et al.

(10) Patent No.: US 8,560,174 B2
(45) Date of Patent: Oct. 15, 2013

(54) ELECTRIC POWER STEERING SYSTEM

(75) Inventors: Akihiko Nishimura, Okazaki (JP); Terutaka Tamaizumi, Okazaki (JP); Masayuki Kita, Okazaki (JP); Shinya Aono, Okazaki (JP); Jun Hasegawa, Okazaki (JP); Akira Nambu, Okazaki (JP)

(73) Assignee: JTEKT Corporation, Osaka (JP)

( * ) Notice: Subject to any disclaimer, the term of this patent is extended or adjusted under 35 U.S.C. 154(b) by 105 days.

(21) Appl. No.: 12/818,540

(22) Filed: Jun. 18, 2010

(65) Prior Publication Data
US 2010/0324783 A1 Dec. 23, 2010

(30) Foreign Application Priority Data

Jun. 19, 2009 (JP) .................................. 2009-146666

(51) Int. Cl.
*B62D 6/00* (2006.01)
*B63G 8/20* (2006.01)

(52) U.S. Cl.
CPC ...................................... *B62D 6/00* (2013.01)
USPC .............................. 701/41; 180/400; 180/404

(58) Field of Classification Search
USPC ........................ 701/41, 42; 180/404–414, 400
See application file for complete search history.

(56) References Cited

U.S. PATENT DOCUMENTS

| | | | | |
|---|---|---|---|---|
| 5,861,725 A | * | 1/1999 | Endo et al. ..................... | 318/434 |
| 6,122,579 A | * | 9/2000 | Collier-Hallman et al. .... | 701/41 |
| 6,148,948 A | * | 11/2000 | Shimizu et al. ............... | 180/446 |
| 6,681,165 B2 | * | 1/2004 | Shibasaki et al. ............... | 701/41 |
| 7,275,617 B2 | * | 10/2007 | Endo et al. ..................... | 180/402 |
| 2003/0188914 A1 | * | 10/2003 | Norman et al. ............... | 180/404 |
| 2007/0162206 A1 | | 7/2007 | Tamaizumi | |
| 2009/0079373 A1 | * | 3/2009 | Nagase et al. ........... | 318/400.22 |
| 2009/0299575 A1 | | 12/2009 | Kita et al. | |
| 2011/0036660 A1 | * | 2/2011 | Kojo et al. ..................... | 180/446 |

FOREIGN PATENT DOCUMENTS

| | | |
|---|---|---|
| EP | 1 944 220 A2 | 7/2008 |
| JP | A-2006-142932 | 6/2006 |

OTHER PUBLICATIONS

Aug. 4, 2011 Search Report issued for European Application No. 10166340.9.
Jun. 17, 2013 Japanese Office Action issued in Japanese Patent Application No. 2009-146666 (with translation).

* cited by examiner

*Primary Examiner* — Thomas Tarcza
*Assistant Examiner* — Tyler J Lee
(74) *Attorney, Agent, or Firm* — Oliff & Berridge, PLC

(57) ABSTRACT

A steering torque shift control amount calculation unit (31) calculates the steering torque shift control amount (εts) by multiplying the basic shift amount (εts_b) used as the basic compensation component by the transition coefficient (Kss). Then, the steering torque shift control amount (εts) is subjected to the low-pass filter process in an abrupt change prevention processing unit (32). An abrupt change prevention processing unit (40) is provided in the steering torque shift control amount calculation unit (31). The transition coefficient (Kss) is subjected to the low-pass filter process in the abrupt change prevention processing unit (40). The cutoff frequency of the low-pass filter that forms the abrupt change prevention processing unit (40) is set to a value lower than the cutoff frequency of the low-pass filter that forms the abrupt change prevention processing unit (32) that executes the low-pass filter process on the torque shift control amount (εts).

11 Claims, 8 Drawing Sheets

ELECTRIC POWER STEERING SYSTEM

INCORPORATION BY REFERENCE

The disclosure of Japanese Patent Application No. 2009-146666 filed on Jun. 19, 2009 including the specification, drawings and abstract is incorporated herein by reference in its entirety.

BACKGROUND OF THE INVENTION

1. Field of the Invention

The invention relates to an electric power steering system.

2. Description of the Related Art

In an electric power steering system (EPS) that uses a motor as a drive source, various compensation controls are executed in order to provide a good steering feel.

The states of a steering operation performed by a driver (steering states) are broadly grouped into the steering angle increasing state, the steering angle maintained state, and the steering angle decreasing state. In the steering angle increasing state, the steering angle is increased. In the steering angle maintained state, the steering angle is maintained. In the steering angle decreasing state, the steering angle is decreased. The steering feel required by the driver varies depending on the steering states. The driver tends to have an uncomfortable steering feel especially during the transition of the steering states.

To address the above-described problem, Japanese Patent Application Publication No. 2006-142932 (JP-A-2006-142932) describes a technology relating to an EPS. According to the technology described in JP-A-2006-142932, the value of steering torque, used as the basis for calculation of the base assist control amount, is corrected based on the steering state at a stage prior to the calculation of the base assist control amount (steering torque shift control). That is, correcting the steering torque at the stage prior to the calculation of the base assist control amount makes it possible to obtain, with a simple configuration, the assist characteristic that is required in each steering state although the required assist characteristic varies depending on the steering states. More specifically, in the steering angle maintained state and the steering angle decreasing state, the steering torque shift control is executed in such a manner that the absolute value of the base assist control amount increases. Thus, it is possible to reduce the effort of the driver required in the steering angle maintained state, and to reduce an uncomfortable feel that is given to the driver during the transition from the steering angle maintained state to the steering angle decreasing state. As a result, it is possible to provide a better steering feel.

In the steering torque shift control according to the technology described in JP-A-2006-142932, the compensation component in accordance with the steering state is calculated by multiplying the basic compensation component by the transition coefficient. The basic compensation component is used to change the steering torque to increase the assist force. The transition coefficient is continuously changed in response to the transition of the steering states indicated by the steering speed. Also, the compensation component is subjected to the abrupt change prevention process that is executed with the use of a low-pass filter. Thus, it is possible to suppress a sharp change in the assist force. As a result, it is possible to provide a good steering feel even during the transition of the steering states.

However, if improvement of the basic performance, for example, the response to a steering operation, is promoted, the rate of change in the transition coefficient becomes higher. As a result, a slight change in the steering speed may cause a great change in the output. Thus, the influence of noise may be more significant, and hunting may occur in the output. In addition, the transition coefficient differs in frequency band from the compensation component obtained by multiplying the basic compensation component by the transition coefficient as described above. Therefore, there is a possibility that the filter process executed on the compensation component will not provide effective measures.

SUMMARY OF THE INVENTION

It is an object of the invention to provide an electric power steering system that solves the above-described problem and that provides a good steering feel.

An aspect of the invention relates to an electric power steering system that includes: a steering force assisting device that supplies a steering system with assist force for assisting a steering operation, using a motor as a drive source; and a control unit that controls an operation of the steering force assisting device. The control unit calculates a basic component of the assist force that is supplied to the steering system based on steering torque, and executes a compensation control for correcting the steering torque that is used for calculation of the basic component to increase the assist force that is supplied to the steering system when a steering state is a steering angle decreasing state or a steering angle maintained state. The control unit calculates a compensation component in accordance with the steering state by multiplying a basic compensation component, used to correct the steering torque to increase the assist force, by a transition coefficient that continuously changes in response to transition of the steering state indicated by a steering speed. The control unit executes a low-pass filter process on the compensation component and a low-pass filter process on the transition coefficient, and sets a cutoff frequency of the low-pass filter process executed on the transition coefficient to a value lower than a cutoff frequency of the low-pass filter process executed on the compensation component.

In the configuration described above, the frequency band of the transition coefficient is lower than the frequency band of the compensation component. Accordingly, it is possible to suppress sharp changes in the output transition coefficient by executing the low-pass filter process suitable for the frequency band of the transition coefficient.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Hereafter, a first embodiment of the invention will be described with reference to the accompanying drawings.

Figure 1:
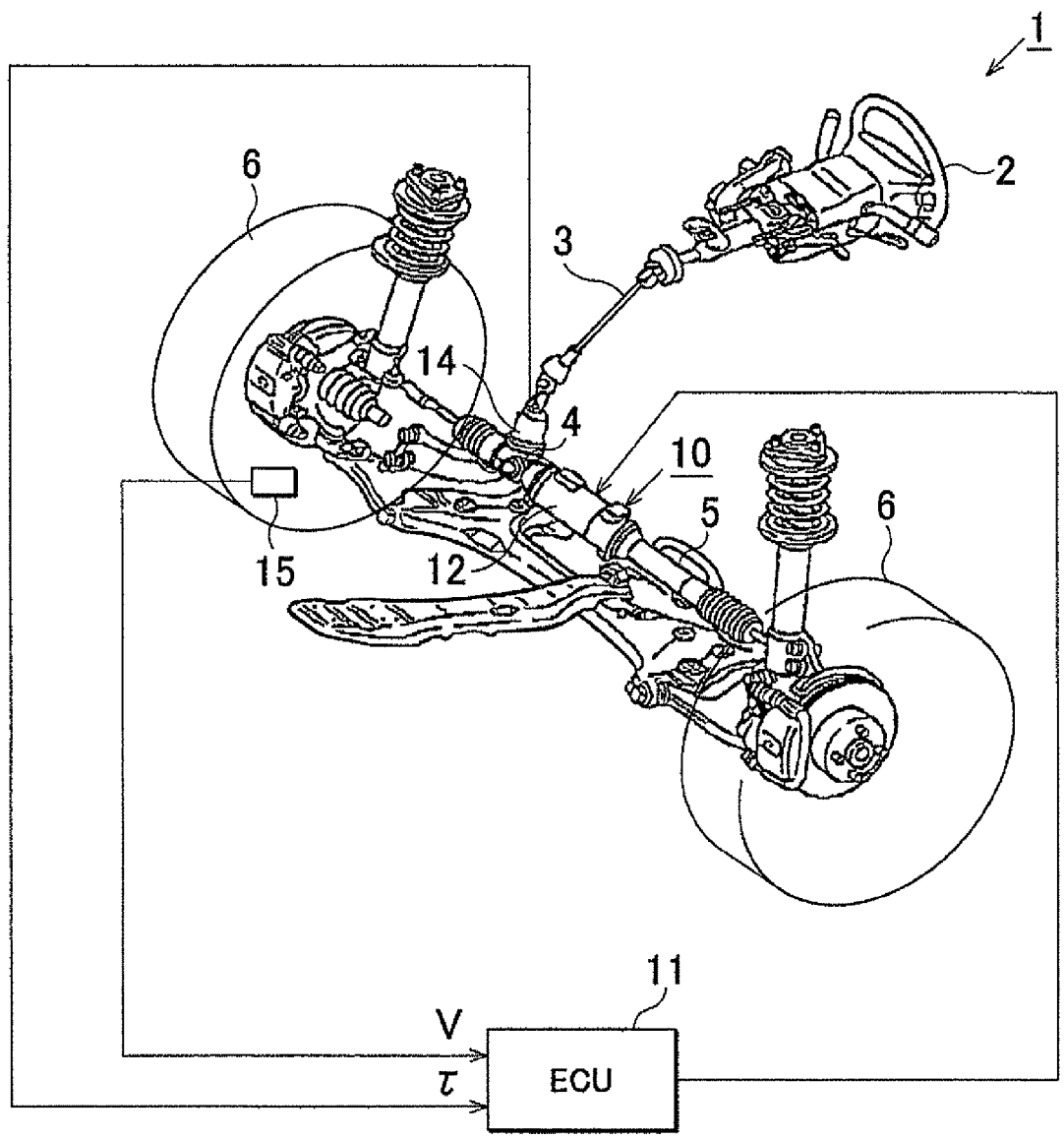
FIG. 1 is a view schematically showing the configuration of an electric power steering system (EPS)

FIG. 1 is a view schematically showing the configuration of an electric power steering system (EPS) 1 according to the first embodiment. A steering shaft 3, to which a steering wheel 2 is fixed, is connected to a rack shaft 5 via a rack-and-pinion mechanism 4. The rotation of the steering shaft 3, caused in response to a steering operation, is converted into a linear reciprocation of the rack shaft 5 by the rack-and-pinion mechanism 4. The steering angle of steered wheels 6 is changed by the linear reciprocation of the rack shaft 5. As a result, the direction in which a vehicle travels is changed.

The EPS 1 includes an EPS actuator 10 and an ECU 11. The EPS actuator 10 serves as a steering force assisting device that supplies a steering system with assist force for assisting a steering operation. The ECU 11 serves as a control unit that controls an operation of the EPS actuator 10.

The EPS actuator 10 is a rack-assist EPS actuator where a motor 12 that serves as a drive source for the EPS actuator 10 is provided coaxially with the rack shaft 5. The motor torque generated by the motor 12 is transmitted to the rack shaft 5 via a ball transfer mechanism (not shown). The motor 12 in the first embodiment is a brushless motor. The motor 12 is rotated upon reception of three-phase (U, V, W) drive currents from the ECU 11.

A torque sensor 14 and a vehicle speed sensor 15 are connected to the ECU 11. The ECU 11 detects the steering torque τ and the vehicle speed V based on the signal output from the torque sensor 14 and the signal output from the vehicle speed sensor 15, respectively. The ECU 11 calculates the target assist force based on the detected steering torque τ and the detected vehicle speed V. Then, in order to cause the EPS actuator 10 to generate the target assist force, the ECU 11 controls the operation of the EPS actuator 10, that is, the assist force that is supplied to the steering system, through the supply of the drive currents to the motor 12 that serves as the drive source for the EPS actuator 10.

Figure 2:
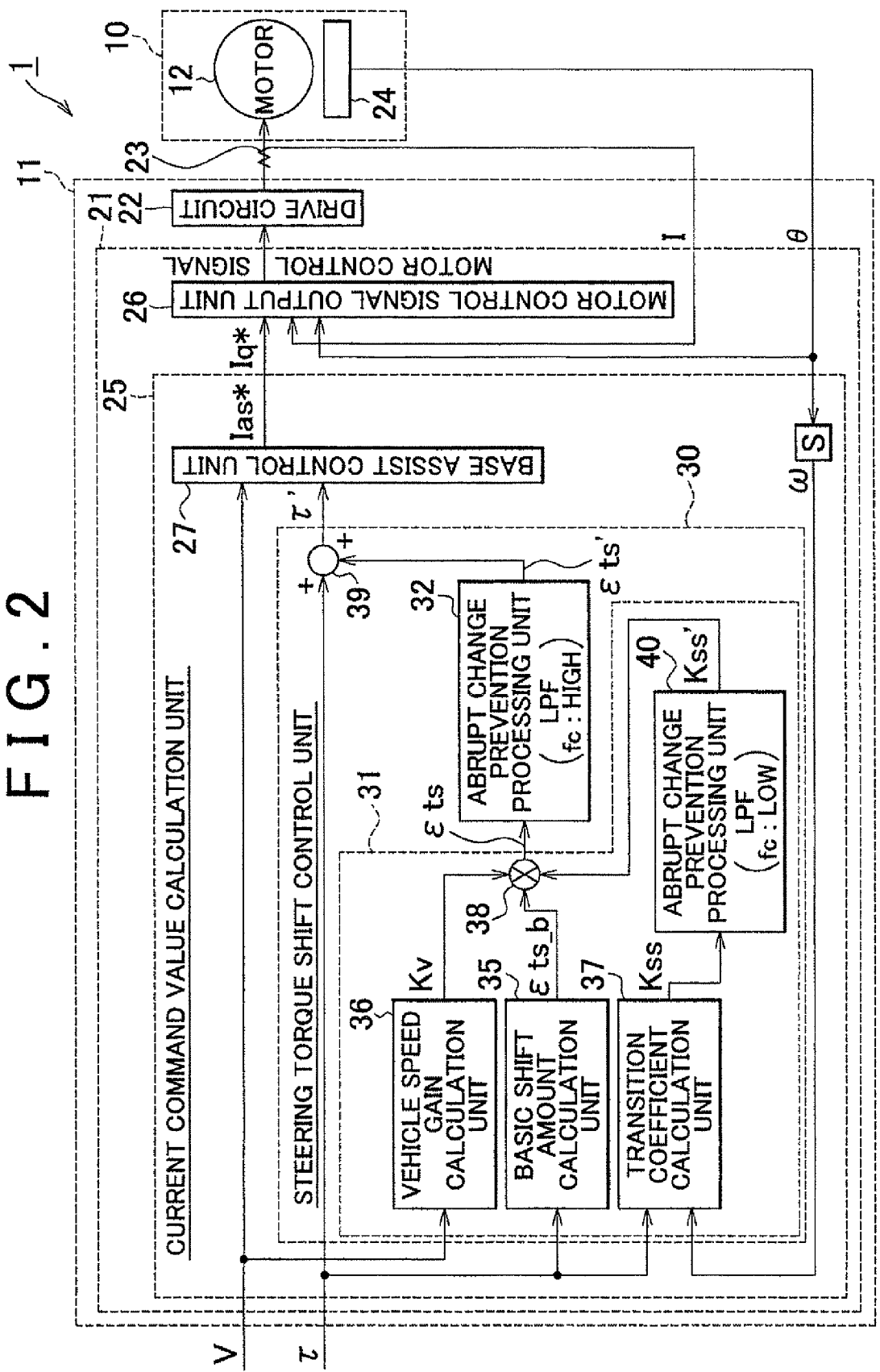
FIG. 2 is a control block diagram for the EPS.

Next, the manner of the assist control that is executed in the EPS 1 according to the first embodiment will be described. FIG. 2 is a control block diagram for the EPS 1 according to the first embodiment. The ECU 11 includes a microcomputer 21 that outputs a motor control signal, and a drive circuit 22 that supplies the drive currents to the motor 12 that serves as the drive source for the EPS actuator 10 based on the motor control signal.

A current sensor 23 and a rotational angle sensor 24 are connected to the ECU 11. The current sensor 23 detects the actual current value I, which is the value of electric current that is supplied to the motor 12. The rotational angle sensor 24 detects the rotational angle θ of the motor 12. The microcomputer 21 outputs a motor control signal to the drive circuit 22 based on the actual current value I and the rotational angle θ of the motor 12 that are detected based on the signals output from these sensors, the steering torque τ, and the vehicle speed V. The control block described below is realized by a computer program that is executed by the microcomputer 21.

More specific description will be provided below. The microcomputer 21 according to the first embodiment includes a current command value calculation unit 25 and a motor control signal output unit 26. The current command value calculation unit 25 calculates the current command value Iq* that corresponds to the target assist force that should be generated by the EPS actuator 10. The motor control signal output unit 26 outputs a motor control signal based on the current command value Iq* calculated by the current command value calculation unit 25.

The current command value calculation unit 25 includes a base assist control unit 27 that calculates the base assist control amount Ias* that is the basic component of the target assist force. The base assist control unit 27 receives the steering torque τ (τ') and the vehicle speed V. The base assist control unit 27 calculates the base assist control amount Ias* based on the steering torque τ and the vehicle speed V. As the absolute value of the steering torque τ received by the base assist control unit 27 becomes larger and as the vehicle speed V received by the base assist control unit 27 becomes lower, the base assist control unit 27 calculates the base assist control amount Ias* having a larger absolute value. Then, the current command value calculation unit 25 outputs the value derived based on the base assist control amount Ias* calculated by the base assist control unit 27 to the motor control signal output unit 26. The value derived based on the base assist control amount Ias* is the current command value Iq* that is used as the target assist force in the power assist control.

The motor control signal output unit 26 receives, in addition to the current command value Iq* calculated by the current command value calculation unit 25, the actual current value I detected by the current sensor 23 and the rotational angle θ of the motor 12 detected by the rotational angle sensor 24. The motor control signal output unit 26 executes the current feedback control so that the actual current value I is brought to the current command value Iq* that corresponds to the target assist force. Thus, the motor control signal output unit 26 produces a motor control signal.

More specifically, the motor control signal output unit 26 converts the phase current values (Iu, Iv, Iw) of the motor 12, detected as the actual current value I, into the d-axis current value and the q-axis current value of the d/q coordinate system (d/q conversion). In this way, the motor control signal output unit 26 executes the current feedback control.

The motor control signal output unit 26 receives the current command value Iq* as the q-axis current command value. The motor control signal output unit 26 executes the d/q conversion on the phase current values (Iu, Iv, Iw) based on the rotational angle θ detected by the rotational angle sensor 24, and calculates the d-axis voltage command value and the q-axis voltage command value based on the d-axis current value, the q-axis current value, and the q-axis current command value. Then, the motor control signal output unit 26 executes the d/q reverse conversion on the d-axis voltage command value and the q-axis voltage command value to calculate the phase voltage command values (Vu*, Vv*, Vw*), and produces the motor control signal based on the phase voltage command values.

The microcomputer 21 outputs the motor control signal produced in the above-described manner to the drive circuit 22, and the drive circuit 22 supplies the motor 12 with the three-phase drive currents based on the motor control signal. In this way, the ECU 11 controls the operation of the EPS actuator 10.

Next, the manner of the steering torque shift control that is executed by the microcomputer 21 (current command value calculation unit 25) according to the first embodiment will be described.

The microcomputer 21 executes the compensation control (steering torque shift control) for correcting the steering torque $\tau$ that is used as the basis for the power assist control depending on the three steering states. The three steering states are the steering angle increasing state where the steering angle is increased, the steering angle maintained state where the steering angle is maintained, and the steering angle decreasing state where the steering angle is decreased.

The current command value calculation unit 25 includes a steering torque shift control unit 30 that corrects the steering torque $\tau$. The steering torque shift control unit 30 receives, in addition to the steering torque $\tau$, the vehicle speed V and the rotational angular speed $\omega$ of the motor 12. The base assist control unit 27 receives the corrected steering torque $\tau'$ that is derived through the correction in the steering torque shift control that is executed in the steering torque shift control unit 30 based on the various state amounts.

The steering torque shift control unit 30 includes a steering torque shift control amount calculation unit 31 and an abrupt change prevention processing unit 32. The steering torque shift control amount calculation unit 31 calculates the steering torque shift control amount $\epsilon$ts that is the compensation component used to execute the steering torque shift control. The abrupt change prevention processing unit 32 executes the filter process to suppress a sharp change in the steering torque shift control amount $\epsilon$ts.

The steering torque shift control amount calculation unit 31 includes a basic shift amount calculation unit 35, a vehicle speed gain calculation unit 36, and a transition coefficient calculation unit 37. The basic shift amount calculation unit 35 calculates the basic shift amount $\epsilon$ts_b that is used as the basic compensation component used in the steering torque shift control based on the steering torque $\tau$. The vehicle speed gain calculation unit 36 calculates the vehicle speed gain Kv that corresponds to the vehicle speed V. The transition coefficient calculation unit 37 calculates the transition coefficient Kss that indicates the steering state achieved by the driver.

Figure 3:
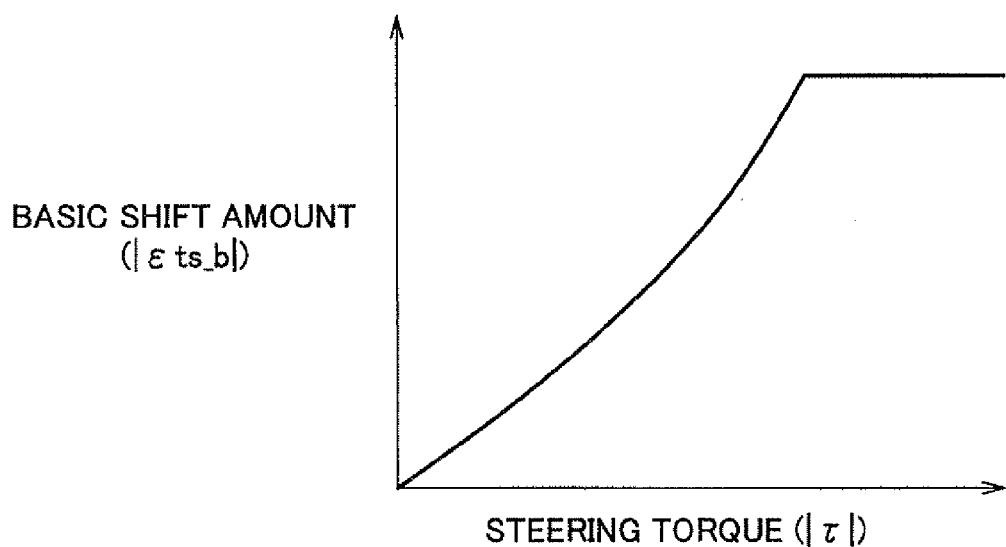
FIG. 3 is a graph showing the manner for calculating the basic shift amount.
Figure 4:
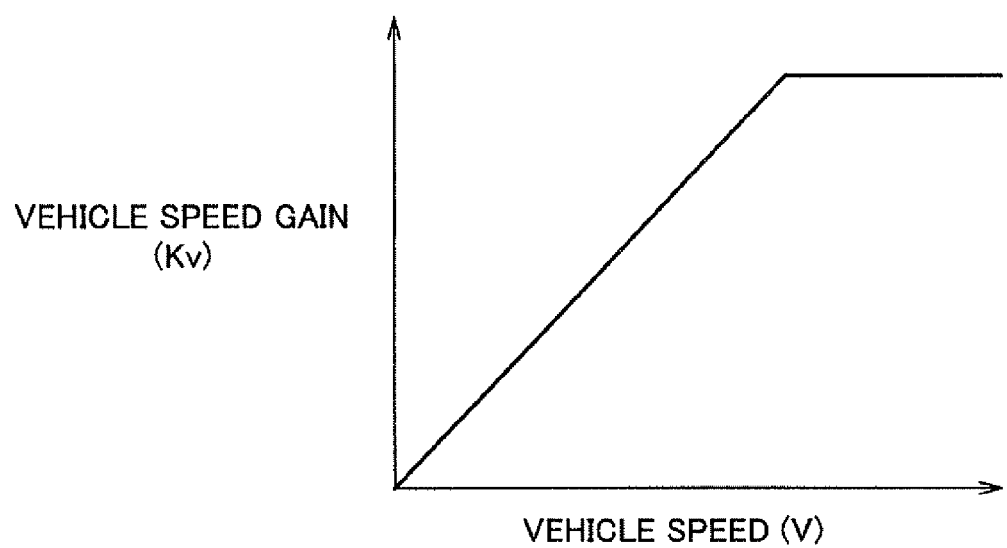
FIG. 4 is a graph showing the manner for calculating the vehicle speed gain.

As shown in FIG. 3, as the absolute value of the steering torque $\tau$ received by the basic shift amount calculation unit 35 becomes larger, the basic shift amount calculation unit 35 calculates the basic shift amount $\epsilon$ts_b having a larger absolute value, that is, calculates the basic compensation component used to correct the steering torque $\tau$ to increase the assist force. The basic shift amount calculation unit 35 calculates the basic shift amount $\epsilon$ts_b according to a map where the steering torque $\tau$ and the basic shift amount $\epsilon$ts_b are correlated with each other. The sign of the basic shift amount $\epsilon$ts_b output from the basic shift amount calculation unit 35 is the same as the sign of the steering torque $\tau$ that is received by the basic shift amount calculation unit 35. As shown in FIG. 4, as the vehicle speed V received by the vehicle speed gain calculation unit 36 becomes higher, the vehicle speed gain calculation unit 36 calculates the larger vehicle speed gain Kv.

The transition coefficient calculation unit 37 receives the steering torque $\tau$ and the rotational angular speed $\omega$ of the motor 12. The rotational angular speed $\omega$ of the motor 12 is used as the rotational angular speed of the steering shaft 3, rotated in accordance with the motor 12, and the steering wheel 2, that is, the proxy variable of the steering speed. The transition coefficient calculation unit 37 calculates the transition coefficient Kss having the value that changes depending on the three steering states that are the steering angle increasing state, the steering angle maintained state and the steering angle decreasing state, based on the direction of the steering torque $\tau$ received by the transition coefficient calculation unit 37 and the rotational angular speed $\omega$ received by the transition coefficient calculation unit 37. That is, the transition coefficient calculation unit 37 calculates the transition coefficient Kss that continuously changes in response to the transition of the steering states indicated by the steering speed.

Figure 5A:
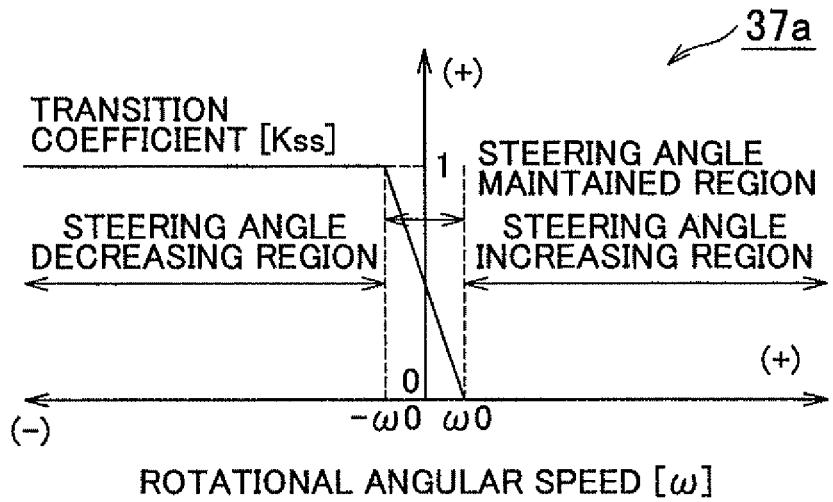
FIG. 5A is a graph showing the manner for calculating the transition coefficient.
Figure 5B:
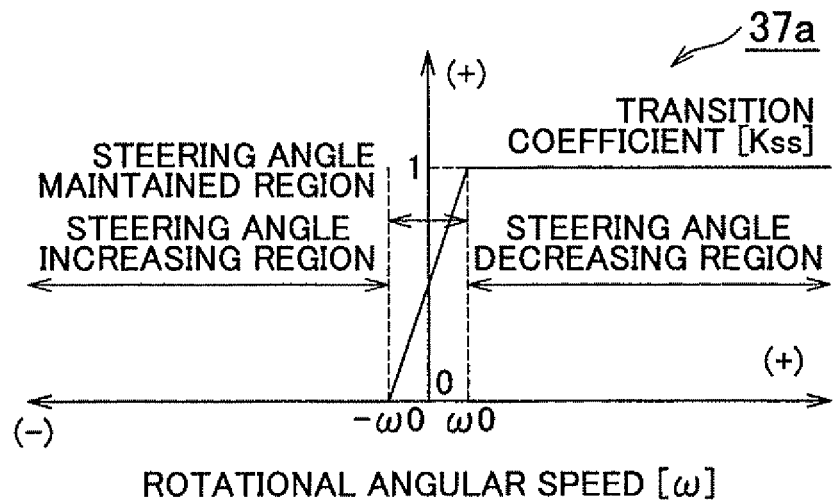
FIG. 5B is a graph showing the manner for calculating the transition coefficient.

Specifically, the transition coefficient calculation unit 37 has a map 37a where the direction of the steering torque $\tau$ ($\tau>0$, $\tau<0$), the rotational angular speed $\omega$, and the transition coefficient Kss are correlated with each other, as shown in FIGS. 5A and 5B. The transition coefficient Kss is calculated with the use of the map 37a.

More specifically, as shown in the map 37a in FIG. 5A, when the sign of the steering torque $\tau$ is a positive sign ($\tau>0$), the region, where the rotational angular speed $\omega$ of the motor 12 is equal to or higher than the predetermined speed $\omega 0$ that is near 0, is set as the region that corresponds to the steering angle increasing state. In addition, the region, where the rotational angular speed $\omega$ of the motor 12 is equal to or lower than the predetermined speed $-\omega 0$ that is near 0, is set as the region that corresponds to the steering angle decreasing state.

On the other hand, as shown in the map 37a in FIG. 5B, when the sign of the steering torque $\tau$ is a negative sign ($\tau<0$), the region, where the rotational angular speed $\omega$ of the motor 12 is equal to or higher than the predetermined speed $\omega 0$ that is near 0, is set as the region that corresponds to the steering angle decreasing state. In addition, the region, where the rotational angular speed $\omega$ of the motor 12 is equal to or lower than the predetermined speed $-\omega 0$ that is near 0, is set as the region that corresponds to the steering angle increasing state.

Basically, the transition coefficient calculation unit 37 makes the following determinations. The transition coefficient calculation unit 37 determines the state where the sign of the steering torque $\tau$ and the sign of the rotational angular speed $\omega$ of the motor 12 coincide with each other, that is, the state where the direction of the steering torque $\tau$ and the direction of the steering speed coincide with each other, as the steering angle increasing state. Also, the transition coefficient calculation unit 37 determines the state where the sign of the steering torque $\tau$ and the sign of the rotational angular speed $\omega$ of the motor 12 do not coincide with each other, that is, the state where the direction of the steering torque $\tau$ and the direction of the steering speed do not coincide with each other, as the steering angle decreasing state. Also, the transition coefficient calculation unit 37 determines the state where the rotational angular speed $\omega$ is within the predetermined range near 0 ($-\omega 0<\omega<\omega 0$) as the steering angle maintained state.

According to the thus configured map 37a, when the rotational angular speed $\omega$ received by the transition coefficient calculation unit 37 is within the region that corresponds to the steering angle increasing state ($\tau>0$ and $\omega\geq\omega 0$, or $\tau<0$ and $\omega\leq-\omega 0$), the transition coefficient Kss is set to 0. When the rotational angular speed $\omega$ received by the transition coefficient calculation unit 37 is within the region that corresponds to the steering angle decreasing state ($\tau>0$ and $\omega\leq-\omega 0$, or $\tau<0$ and $\omega\geq\omega 0$), the transition coefficient Kss is set to 1.

When the rotational angular speed $\omega$ is within the region that corresponds to the steering angle maintained state (−ω0<ω<ω0), the transition coefficient Kss is set to decrease from 1 to 0 from the region that corresponds to the steering angle decreasing state toward the region that corresponds to the steering angle decreasing state, based on the rotational angular speed ω.

As shown in FIG. 2, in the first embodiment, a multiplier 38 receives the basic shift amount ∈ts_b calculated by the basic shift amount calculation unit 35, the vehicle speed gain Kv calculated by the vehicle speed gain calculation unit 36, and the transition coefficient Kss (Kss') calculated by the transition coefficient calculation unit 37. The steering torque shift control amount calculation unit 31 outputs the value, obtained by multiplying the basic shift amount ∈ts_b by the transition coefficient Kss and the vehicle speed gain Kv, as the steering torque shift control amount ∈ts.

The abrupt change prevention processing unit 32 is formed of a low-pass filter. The steering torque shift control amount ∈ts output from the steering torque shift control amount calculation unit 31 is subjected to the filter process for suppressing a sharp change, during passage through the abrupt change prevention processing unit 32 (abrupt change prevention process). In the steering torque shift control unit 30, the steering torque shift control amount ∈ts' derived through the filter process executed by the abrupt change prevention processing unit 32 is added to the steering torque τ in an adder 39. In this way, the steering torque shift control unit 30 corrects the received steering torque τ, that is, executes the steering torque shift control. The corrected steering torque τ' is output to the base assist control unit 27.

As described above, when the steering state is the steering angle maintained state or the steering angle decreasing state, the steering torque shift control amount ∈ts, with which the base assist control amount Ias* is increased by the corrected steering torque τ', is calculated by executing the steering torque shift control. As a result, it is possible to reduce the effort of the driver required in the steering angle maintained state, and to reduce an uncomfortable feel that is given to the driver during the transition from the steering angle maintained state to the steering angle decreasing state. When the steering state is the steering angle increasing state, the steering torque shift control amount ∈ts is set to 0. Thus, it is possible to reduce the occurrence of excessively light steering feel due to an excess of assist force. As a result, it is possible to provide a good steering feel.

Further, in the first embodiment, an abrupt change prevention processing unit 40 that is formed of a low-pass filter is provided in the steering torque shift control amount calculation unit 31. The multiplier 38 receives the transition coefficient Kss' that is derived through the filter process executed in the abrupt change prevention processing unit 40. The cutoff frequency (fc) of the low-pass filter that forms the abrupt change prevention processing unit 40 is set to a value lower than the cutoff frequency of the low-pass filter that forms the abrupt change prevention processing unit 32 that executes the filter process on the steering torque shift control amount as that is the above-described compensation component.

To sum up the above description, the following effects are produced according to the first embodiment.

The frequency band of the transition coefficient Kss is lower than the frequency band of the steering torque shift control amount ∈ts that is the compensation component. With the configuration described above, it is possible to effectively suppress changes in the transition coefficient Kss output from the abrupt change prevention processing unit 40 by executing the low-pass filter process suitable for the frequency band of the transition coefficient Kss. As a result, it is possible to reduce hunting in the output, and to remove the influence of noise. Thus, it is possible to provide a good steering feel even in the transition of the steering states.

Next, a second embodiment of the invention will be described with reference to the accompanying drawings. For convenience of explanation, the portions same as those in the first embodiment will be denoted by the same reference numerals as those in the first embodiment, and description thereof will not be provided below.

Figure 6:
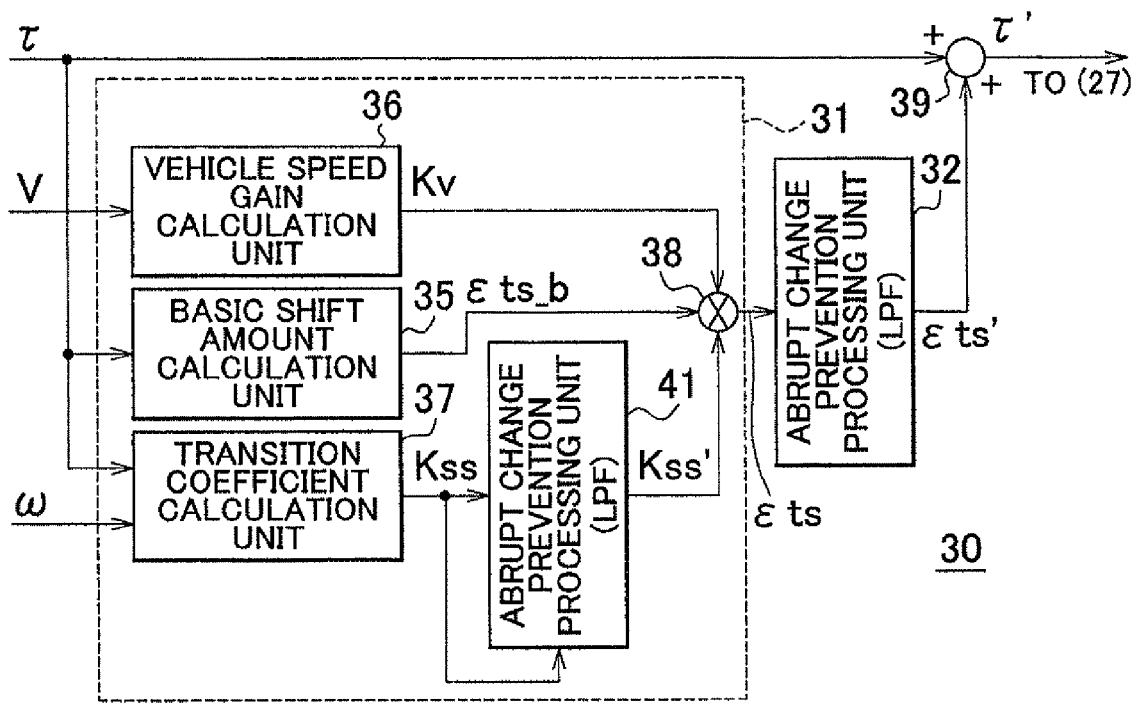
FIG. 6 is a view schematically showing the configuration of a steering torque shift control unit according to a second embodiment of the invention.

As shown in FIG. 6, the second embodiment differs from the first embodiment in the configuration of the steering torque shift control unit 30. More specifically, the configuration of an abrupt change prevention processing unit 41 provided in the steering torque shift control amount calculation unit 31 differs from that of the abrupt change prevention processing unit 40.

The abrupt change prevention processing unit 41 according to the second embodiment receives the transition coefficient Kss that is calculated by the transition coefficient calculation unit 37. The abrupt change prevention processing unit 41 changes the cutoff frequency (fc) of the low-pass filter based on the steering state indicated by the transition coefficient Kss.

When the steering state indicated by the transition coefficient Kss is the steering angle decreasing state or the steering angle maintained state, the cutoff frequency is set to a low value. On the other hand, when the steering state indicated by the transition coefficient is the steering angle increasing state, the cutoff frequency is set to a high value.

The cutoff frequency of the low-pass filter that forms the abrupt change prevention processing unit 41 is set to a value lower than the cutoff frequency of the low-pass filter that forms the abrupt change prevention processing unit 32 that executes the filter process on the steering torque shift control amount ∈ts, as in the first embodiment.

Figure 7:
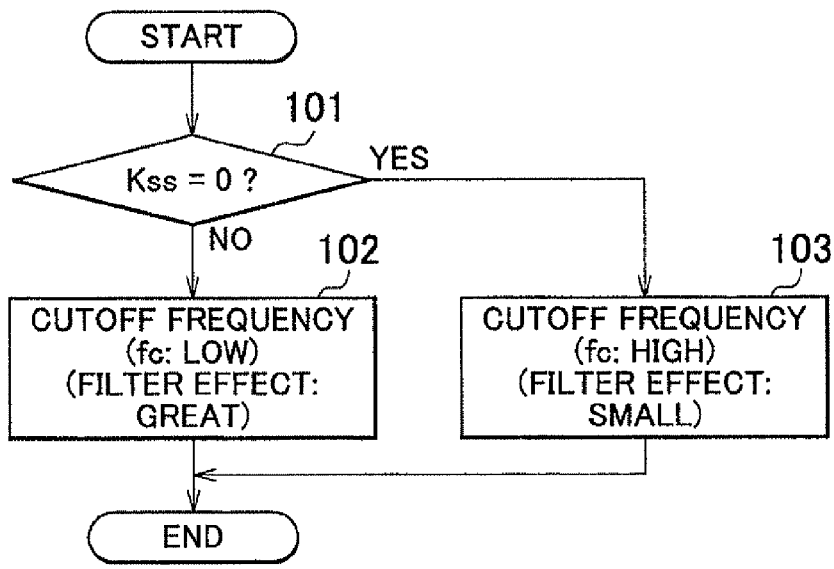
FIG. 7 is a flowchart showing the steps for changing the cutoff frequency.

More specifically, as shown in the flowchart in FIG. 7, the abrupt change prevention processing unit 41 determines whether the received transition coefficient Kss is 0, that is, whether the steering state indicated by the transition coefficient Kss is the steering angle increasing state (step 101). If it is determined that the transition coefficient Kss is not 0 (Kss≠0: "NO" in step 101), that is, if the steering state indicated by the transition coefficient Kss is the steering angle decreasing state or the steering angle maintained state, the cutoff frequency of the low-pass filter is set to a low value (step 102).

In this case, the cutoff frequency is set to a value with which great filter effect for suppressing an abrupt change in the transition coefficient Kss is produced, as in the case of the cutoff frequency (fc) of the low-pass filter that forms the abrupt change prevention processing unit 40 in the first embodiment.

On the other hand, if it is determined in step 101 that the transition coefficient Kss is 0 (Kss=0: "YES" in step 101), that is, if the steering state indicated by the transition coefficient Kss is the steering angle increasing state, the cutoff frequency (fc) of the low-pass filter is set to a high value so that small filter effect is produced. Thus, it is possible to reduce the adverse effects caused by the abrupt change prevention process executed with the use of the low-pass filter.

The driver usually performs the steering operation in the following manner. First, the steering state is the steering angle increasing state where the steering wheel is turned from the steering neutral position. Then, the steering state is switched to the steering angle maintained state. Then, the steering state is switched to the steering angle decreasing state where the steering wheel is returned toward the steering neutral position. The above-described abrupt change prevention process executed with the use of the low-pass filter is effective in suppressing an abrupt change in the assist force that increases during the transition of the steering states from the steering angle maintained state to the steering angle decreasing state.

However, in some actual cases, the steering state is switched from the steering angle maintained state or the steering angle decreasing state directly to the steering angle increasing state without the steering wheel being held at the steering neutral position for a sufficient time period. In such cases, decrease in the assist force that has been increased in the steering angle maintained state or the steering angle decreasing state is retarded by execution of the abrupt change prevention process. Such retardation causes an excess of assist force. The excess of assist force may cause deterioration of the steering feel such as excessively low resistance in the steering angle re-increasing state, reduction in the road state information that is transmitted to the driver via the steering wheel due to the excessively low resistance, and insufficiency of the steering angle increasing feel.

To address the above-described problem, the abrupt change prevention processing unit 41 according to the second embodiment changes the cutoff frequency (fc) of the low-pass filter based on the steering state indicated by the transition coefficient Kss, as described above. The configuration according to the second embodiment produces the following effect in addition to the effects described in the first embodiment.

When the steering state is the steering angle decreasing state or the steering angle maintained state, the filter effect is made large to decrease the rate of increase in the steering torque shift control amount ϵts'. As a result, a sharp change in the assist force is suppressed. On the other hand, when the steering state is the steering angle increasing state, the filter effect is made small to increase the rate of decrease in the steering torque shift control amount ϵts'. As a result, it is possible to suppress an excess of assist force in the above-described steering angle re-increasing state, and deterioration of steering feel due to the excess of assist force. Accordingly, the effect of the abrupt change prevention control is not impaired. Even in the steering angle re-increasing state, it is possible to suppress an excess of assist force by promptly decreasing the assist force that has been increased in the steering angle maintained state or the steering angle decreasing state. As a result, it is possible to prevent excessively low resistance, reduction in the road state information that is transmitted to the driver via the steering wheel due to the excessively low resistance, and insufficiency of the steering angle increasing feel. As a result, it is possible to provide a good steering feel.

The embodiments described above may be modified as follows. In each embodiment described above, the invention is applied to the rack-assist EPS 1. Alternatively, the invention may be applied to a pinion-assist EPS or a column-assist EPS.

In each embodiment described above, the steering torque shift control amount calculation unit 31 calculates the steering torque shift control amount ϵts by multiplying the basic shift amount ϵts_b and the vehicle speed gain Kv by the transition coefficient Kss. However, the manner for calculating the steering torque shift control amount ϵts is not limited to this. The steering torque shift control amount ϵts may be calculated in any manner as long as the basic shift amount ϵts_b that is the basic compensation component is multiplied by the transition coefficient Kss. For example, the vehicle speed gain Kv may be omitted, or the basic shift amount ϵts_b may be multiplied by another component instead of the vehicle speed gain Kv.

In each embodiment described above, the transition coefficient Kss is calculated using the rotational angular speed ω of the motor 12 as the proxy variable of the steering speed. However, the manner for calculating the transition coefficient Kss is not limited to this. For example, the rotational angle of the steering wheel 2, that is, the steering angle may be detected by, for example, a steering sensor, and the transition coefficient Kss may be calculated based on the steering speed that is directly detected by, for example, differentiating the steering angle.

Figure 8:
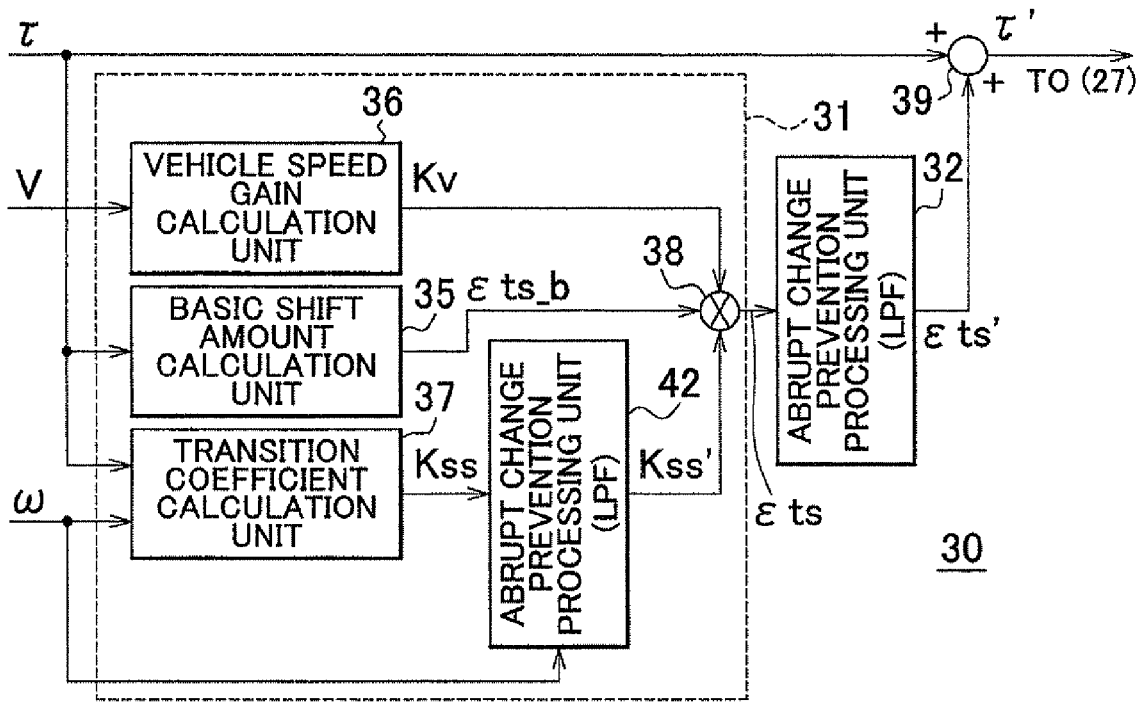
FIG. 8 is a view schematically showing the configuration of a steering torque shift control unit according to another example.

In the second embodiment described above, the abrupt change prevention processing unit 41 changes the cutoff frequency (fc) of the low-pass filter based on the steering state indicated by the transition coefficient Kss. However, the manner for changing the cutoff frequency (fc) is not limited to this. For example, as in an abrupt change prevention processing unit 42 shown in FIG. 8, the cutoff frequency (fc) of the low-pass filter may be changed based on the steering speed, more specifically, the rotational angular speed ω of the motor 12 that is the proxy variable of the steering speed.

Usually, when the steering state is the steering angle increasing state, the steering speed is high. Therefore, when the absolute value of the steering speed exceeds a predetermined speed at which there is a high possibility that the steering state is the steering angle increasing state, the cutoff frequency is set to a high value, that is, the filter effect is made small. Thus, it is possible to produce the same effect as that in the second embodiment.

Figure 9:
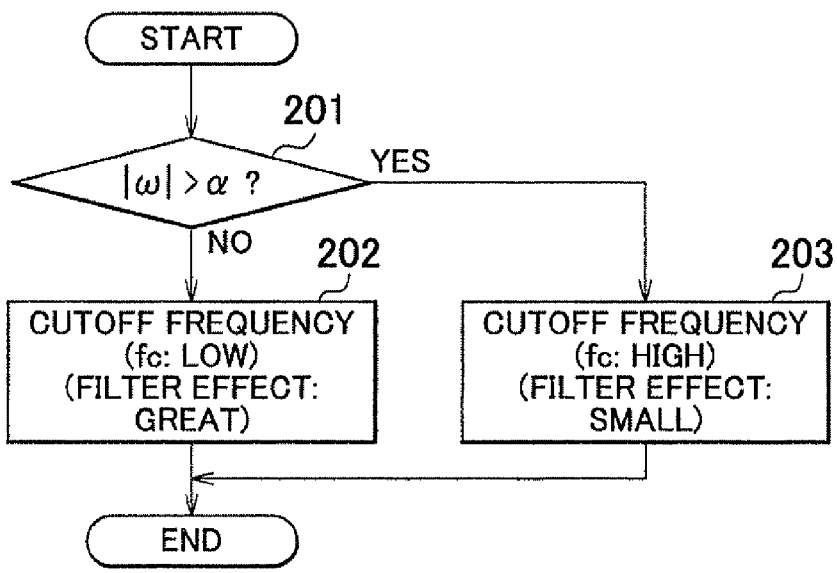
FIG. 9 is a flowchart showing the steps for changing the cutoff frequency according to the other example.

More specifically, as shown in the flowchart in FIG. 9, it is determined whether the absolute value of the rotational angular speed ω of the motor 12, which is the proxy variable of the steering speed, exceeds the predetermined speed α (step 201). If it is determined that the rotational angular speed ω of the motor 12 is equal to or lower than the predetermined speed α ($|\omega| \le \alpha$: "NO" in step 201), that is, if there is a high possibility that the steering state is the steering angle decreasing state or the steering angle maintained state, the cutoff frequency of the low-pass filter is set to a low value (step 202). As in the second embodiment, the cutoff frequency in this case is set to a value with which great filter effect for suppressing an abrupt change in the transition coefficient Kss is produced, as in the case of the cutoff frequency (fc) of the low-pass filter that forms the abrupt change prevention processing unit 40 in the first embodiment. If it is determined in step 201 that the rotational angular speed ω of the motor 12 exceeds the predetermined speed α ($|\omega| > \alpha$: "YES" in step 201), that is, if there is a high possibility that the steering state is the steering angle increasing state, the cutoff frequency (fc) of the low-pass filter is set to a high value so that the small filter effect is produced (step 203).

Figure 10:
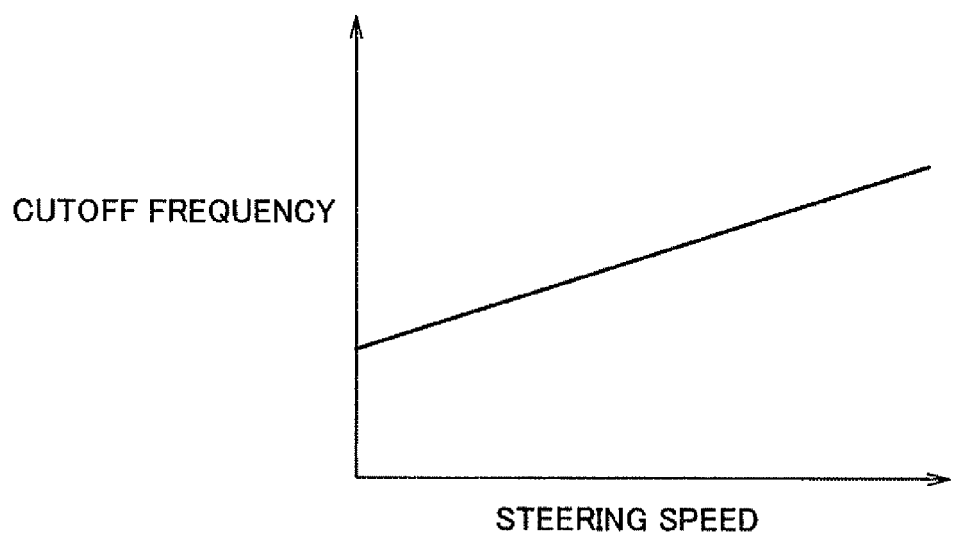
FIG. 10 is a graph showing the relationship between the steering speed and the cutoff frequency.

In addition, in the case where the cutoff frequency (fc) of the low-pass filter is changed based on the rotational angular speed ω of the motor 12 that is the proxy variable of the steering speed as described above, the cutoff frequency is set to a higher value as the steering speed becomes higher as shown in FIG. 10. Thus, it is possible to provide a better steering feel. FIG. 10 conceptually shows the cutoff frequency that increases with an increase in the steering speed. Note that the cutoff frequency and the steering speed need not be in a proportional relationship. The cutoff frequency need not be linearly increased with an increase in the steering speed. For example, the cutoff frequency may be increased in a stepwise manner as the steering speed becomes higher.

Figure 11:
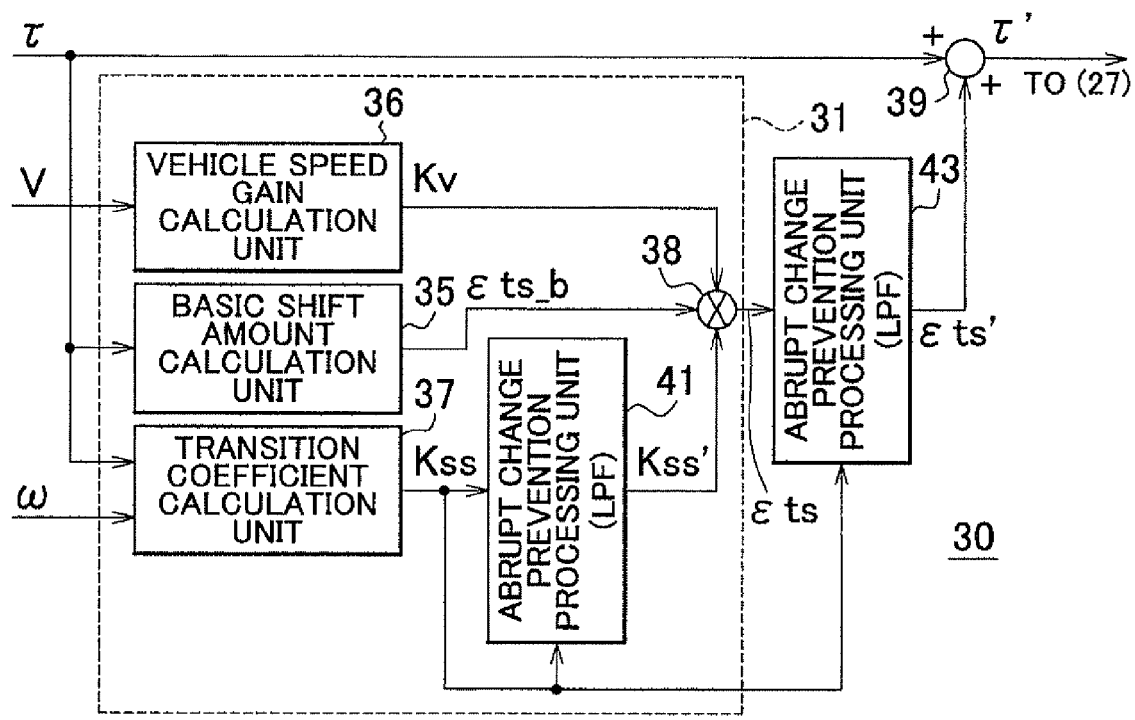
FIG. 11 is a view schematically showing the configuration of a steering torque shift control unit according to another example.

As shown in FIG. 11, an abrupt change prevention processing unit 43 that executes the filter process on the steering torque shift control amount ϵts used as the compensation component may change the cutoff frequency (fc) of the low-pass filter based on the steering state indicated by the transition coefficient Kss, as in the case of the abrupt change prevention processing unit 41 that executes the filter process on the transition coefficient Kss in the second embodiment (see FIG. 7). Thus, it is possible to provide a better steering feel.

Figure 12:
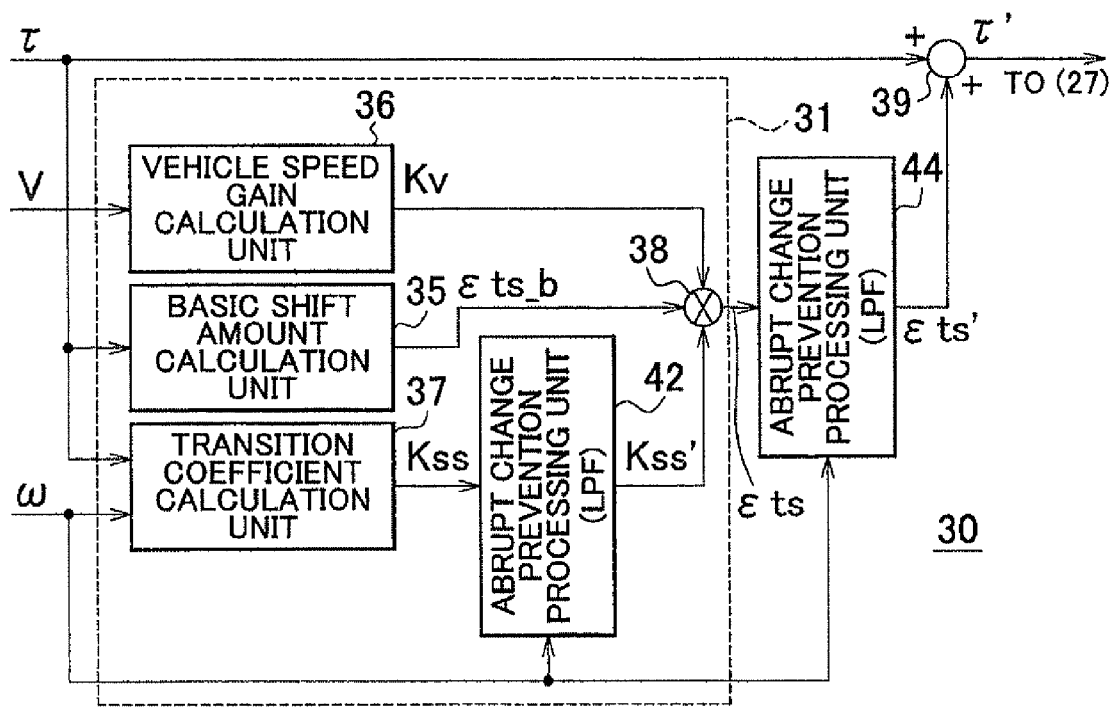
FIG. 12 is a view schematically showing the configuration of a steering torque shift control unit according to another example.

In addition, as shown in FIG. 12, an abrupt change prevention processing unit 44 that executes the filter process on the steering torque shift control amount εts used as the compensation component may change the cutoff frequency (fc) of the low-pass filter based on the rotational angular speed ω of the motor 12 that is the proxy variable of the steering speed (see FIG. 9). With this configuration as well, it is possible to provide a better steering feel.

Next, the technical concept that is figured out based on the above embodiments will be described along with the effects thereof. In the electric power steering system, the cutoff frequency is increased in at least the low-pass filter process that is executed on the transition coefficient.

That is, the rate of change in the transition coefficient itself is higher than the rate of change in the compensation component obtained through multiplication of the basic compensation component. Therefore, in at least the low-pass filter process that is executed on the transition coefficient, the cutoff frequency is set to a high value. As a result, the steering feel is effectively improved.

What is claimed is:

1. An electric power steering system, comprising:
a steering force assisting device that supplies a steering system with assist force for assisting a steering operation; and
a control unit that controls the steering force assisting device, wherein the control unit calculates a basic component of the assist force that is supplied to the steering system based on steering torque, and executes a compensation control for correcting the steering torque that is used for calculation of the basic component to increase the assist force that is supplied to the steering system when a steering state is a steering angle decreasing state or a steering angle maintained state, and
wherein the control unit calculates a compensation component in accordance with the steering state by multiplying a basic compensation component, used to correct the steering torque to increase the assist force, by a transition coefficient that continuously changes in response to transition of the steering state indicated by a steering speed, executes a low-pass filter process on the compensation component and a low-pass filter process on the transition coefficient, and sets a first cutoff frequency of the low-pass filter process executed on the transition coefficient to a value lower than a second cutoff frequency of the low-pass filter process executed on the compensation component configured to suppress changes in the transition coefficient.

2. The electric power steering system according to claim 1, wherein the control unit increases at least one of the first cutoff frequency and the second cutoff frequency when the steering state transitions to a steering angle increasing state from another steering state.

3. The electric power steering system according to claim 2, wherein the control unit changes at least one of the first cutoff frequency and the second cutoff frequency based on the steering speed.

4. The electric power steering system according to claim 1, wherein the control unit changes at least one of the first cutoff frequency and the second cutoff frequency based on the steering speed.

5. The electric power steering system according to claim 4, wherein the control unit increases at least one of the first cutoff frequency and the second cutoff frequency as the steering speed increases.

6. The electric power steering system according to claim 3, wherein the control unit increases at least one of the first cutoff frequency and the second cutoff frequency as the steering speed increases.

7. The electric power steering system according to claim 1, wherein filter effect increases in a way such as to suppress a sharp change in the assist force when the steering state is the steering angle decreasing state or the steering angle maintained state.

8. The electric power steering system according to claim 1, wherein filter effect decreases in a way such as to suppress excess assist force when the steering state is a steering angle increasing state.

9. The electric power steering system of according to claim 1, wherein the transition coefficient is calculated using a map of where the direction of the steering torque is relative to the rotational angular speed.

10. The electric power steering system of according to claim 9, wherein when the sign of the steering torque is greater than zero, and when the rotational angular speed of the motor is lower than zero, the steering state is the steering angle decreasing state.

11. The electric power steering system of according to claim 9, wherein when the sign of the steering torque is less than zero, and when the rotational angular speed of the motor is higher than zero the steering state is the steering angle decreasing state.

\* \* \* \* \*